(12) United States Patent
Walker

(10) Patent No.: US 6,393,753 B1
(45) Date of Patent: May 28, 2002

(54) FISHING ROD FOR ALERTING WHEN A FISH HAS BEEN HOOKED

(75) Inventor: George M. Walker, 55 School St. Apt. 2-E Yonkers 10701, NY (US)

(73) Assignee: George M Walker, Yonkers, NY (US)

( * ) Notice: Subject to any disclaimer, the term of this patent is extended or adjusted under 35 U.S.C. 154(b) by 0 days.

(21) Appl. No.: 09/677,236

(22) Filed: Oct. 2, 2000

(51) Int. Cl.[7] ................................................ A01K 97/12
(52) U.S. Cl. ........................................................ 43/17
(58) Field of Search .......................... 43/17, 17.1, 17.5

(56) References Cited

U.S. PATENT DOCUMENTS

| | | | | |
|---|---|---|---|---|
| 5,088,223 A | * | 2/1992 | Chu | 43/17 |
| 5,261,180 A | * | 11/1993 | Foster et al. | 43/17 |
| 5,274,943 A | * | 1/1994 | Ratcliffe et al. | 43/17 |
| 5,321,391 A | * | 6/1994 | Fox | 43/17 |
| 5,771,624 A | * | 6/1998 | Vickery et al. | 43/17 |
| 5,797,211 A | * | 8/1998 | Bae et al. | 43/17 |
| 6,101,757 A | * | 8/2000 | Draghici | 43/17 |
| 6,253,483 B1 | * | 7/2001 | Reams | 43/17 |

* cited by examiner

*Primary Examiner*—Thomas Price

(57) ABSTRACT

A fishing rod for alerting when a fish has been hooked that includes a handle, a foregrip, a reel seat, a reel, a blade, and apparatus for alerting when the fish has been hooked. The apparatus includes a switch that is operatively connected to the blade, closes when the blade is flexed, and is a transducer having an output directly proportionate to amount of flexing of the blade, an illuminating element that illuminates when the switch is closed for visually alerting that the fish has been hooked, by virtue of the switch being closed when the blade is flexed by the fish hooked, wherein such flexing causes the blade to whip and cause the illuminating element to create a line of light that follows such whipping of the blade, and wherein the intensity of the illuminating element is directly proportionate to the amount of flexing of the blade, by virtue of the output of the transducer being directly proportionate to the amount of flexing of the blade, and an audio element that has an intensity and enunciates when the switch is closed for audibly alerting that the fish has been hooked, wherein the intensity of the audio element is directly proportionate to the amount of flexing of the blade.

5 Claims, 1 Drawing Sheet

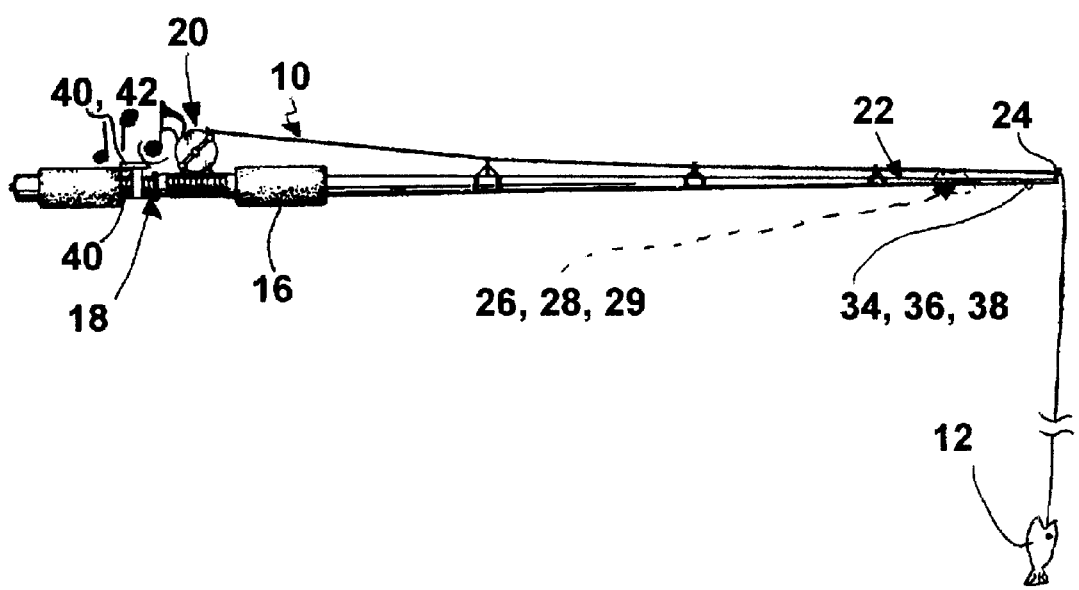

FISHING ROD FOR ALERTING WHEN A FISH HAS BEEN HOOKED

BACKGROUND OF THE INVENTION

1. Field of the Invention

The present invention relates to a fishing rod. More particularly, the present invention relates to a fishing rod for alerting when a fish has been hooked.

2. Description of the Prior Art

Numerous innovations for illuminated fishing rods have been provided in the prior art that will be described. Even though these innovations may be suitable for the specific individual purposes to which they address, however, they differ from the present invention.

FOR EXAMPLE, U.S. Pat. No. 4,026,059 to Ochs teaches a fishing rod assembly, the rod of which is a transparent or translucent member fitted to a handle in which a flashlight bulb is mounted for projecting light along the length of the rod from the handle to the rod tip. The rod may be fabricated of compacted glass fiber that transmits light and is formed at the handle end in the shape of a threaded cap that fastens over threads fitted on the rod end of the handle assembly. The flashlight bulb is mounted at the rod end of the handle assembly and is connected by wires to a battery or batteries mounted in a removable section of the handle.

ANOTHER EXAMPLE, U.S. Pat. No. 4,780,980 to McCullough teaches a fishing rod handle having a light therein is provided wherein the handle has an elongated cylindrical opening communicating with the rearward end, a rigid insert member having an integral tubular portion attached to the handle rearward end with the tubular portion received within the handle cylindrical opening, and having a battery in the handle cylindrical opening with a spring urging it in the direction toward the handle rearward end, and a bulb received in the tubular portion, and a switch attached to the ridged insert with circuitry connecting the switch, the bulb and the battery so that when the switch is in the "on" position the bulb is illuminated.

STILL ANOTHER EXAMPLE, U.S. Pat. No. 5,172,508 to Schmidt et al. teaches an illuminated fishing rod having a self-contained light source. The rod includes an at least translucent pole and a handle connected to the pole. The handle has a cavity therein and which receives an end of the pole. A self contained light source, for example a hand-held flashlight, is removably housed within the cavity of the handle in operative proximity to the end of the pole. The activation switch of the light source may be accessible from the exterior of the handle. The pole may include a cavity therein open at the end connected to the handle. A plurality of fiber optic cables may be received within the pole cavity to conduct light along the pole.

YET ANOTHER EXAMPLE, U.S. Pat. No. 5,347,741 to Konrad teaches an illuminated fishing rod for fishing under poor ambient lighting conditions. The fishing rod includes a translucent and hollow rod coupled to a hollow handle. A light source coupled to a power source within the hollow handle is used for directing light to illuminate the translucent rod. A rotatable switch on the handle is used to activate the light source.

It is apparent that numerous innovations for illuminated fishing rods have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a fishing rod for alerting when a fish has been hooked that avoids the disadvantages of the prior art.

ANOTHER OBJECT of the present invention is to provide a fishing rod for alerting when a fish has been hooked that is simple and inexpensive to manufacture.

STILL ANOTHER OBJECT of the present invention is to provide a fishing rod for alerting when a fish has been hooked that is simple to use.

BRIEFLY STATED, YET ANOTHER OBJECT of the present invention is to provide a fishing rod for alerting when a fish has been hooked that includes a handle, a foregrip, a reel seat, a reel, a blade, and apparatus for alerting when the fish has been hooked. The apparatus includes a switch that is operatively connected to the blade, closes when the blade is flexed, and is a transducer having an output directly proportionate to amount of flexing of the blade, an illuminating element that illuminates when the switch is closed for visually alerting that the fish has been hooked, by virtue of the switch being closed when the blade is flexed by the fish hooked, wherein such flexing causes the blade to whip and cause the illuminating element to create a line of light that follows such whipping of the blade, and wherein the intensity of the illuminating element is directly proportionate to the amount of flexing of the blade, by virtue of the output of the transducer being directly proportionate to the amount of flexing of the blade, and an audio element that has an intensity and enunciates when the switch is closed for audibly alerting that the fish has been hooked, wherein the intensity of the audio element is directly proportionate to the amount of flexing of the blade.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole FIGURE of the drawing is a diagrammatic perspective view of the present invention.

LIST OF REFERENCE NUMERALS UTILIZED IN THE DRAWING 10 fishing rod of present invention for alerting when fish 12 has been hooked
12 fish
14 handle
16 foregrip
18 reel seat
20 reel
22 blade
24 free end of blade 22
26 alerting apparatus for alerting when fish 12 has been hooked
28 switch of alerting apparatus 26
29 transducer of switch 28 of alerting apparatus 26
30 power source interface of alerting apparatus 26
32 batteries for accommodating by power source interface 30 of alerting apparatus 26
34 illuminating element of alerting apparatus 26 for visually alerting that fish 12 has been hooked 36 bulb of illuminating element 34 of alerting apparatus 26
38 LED of illuminating element 34 of alerting apparatus 26
40 audio element of alerting apparatus 26 for audibly alerting that fish 12 has been hooked
42 sound chip of audio element 40 of alerting apparatus 26

DETAILED DESCRIPTION OF THE PREFERRED EMBODIMENT

Referring now to the sole FIGURE, which is a diagrammatic perspective view of the present invention, the fishing rod of the present invention is shown generally at 10 for alerting when a fish 12 has been hooked.

The fishing rod 10 comprises a handle 14, a foregrip 16 extending coaxially from the handle 14, a reel seat 18 extending from the handle 14 to the foregrip 16, a reel 20 replaceably attached to the reel seat 18, a blade 22 extending coaxially from the foregrip 16 to a free end 24, and alerting apparatus 26 for alerting when the fish 12 has been hooked.

The alerting apparatus 26 comprises a switch 28 that electrically communicates with a power source interface 30, wherein the power source interface 30 is disposed internally in the handle 14.

The power source interface 30 is for accommodating batteries 32.

The switch 28 is operatively connected to the blade 22, and closes when the blade 22 is flexed.

The switch 28 is a transducer 29 that has an output that is directly proportionate to amount of flexing of the blade 22.

The alerting apparatus 26 further comprises an illuminating element 34 that has an intensity and is disposed externally on the free end 24 of the blade 22, electrically communicates with the switch 28, and illuminates when the switch 28 is closed for visually alerting that the fish 12 has been hooked, by virtue of the switch 28 being closed when the blade 22 is flexed by the fish 12 hooked, wherein such flexing causes the blade 22 to whip and cause the illuminating element 34 to create a line of light that follows such whipping of the blade 22, and wherein the intensity of the illuminating element 34 is directly proportionate to the amount of flexing of the blade 22, by virtue of the output of the transducer 29 being directly proportionate to the amount of flexing of the blade 22.

The illuminating element 34 is a bulb 36.

The illuminating element 34 is an LED 38.

The alerting apparatus 26 further comprises an audio element 40 that has an intensity and is disposed externally on the reel seat 18, electrically communicates with the switch 28, and enunciates when the switch 28 is closed for audibly alerting that the fish 12 has been hooked, by virtue of the switch 28 being closed when the blade 22 is flexed by the fish 12 hooked, wherein the intensity of the audio element 40 is directly proportionate to the amount of flexing of the blade 22, by virtue of the output of the transducer 29 being directly proportionate to the amount of flexing of the blade 22.

The audio element 40 is a sound chip 42.

It will be understood that each of the elements described above, or two or more together, may also find a useful application in other types of constructions differing from the types described above.

While the invention has been illustrated and described a embodied in a fishing rod for alerting when a fish has been hooked, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A fishing rod for alerting when a fish has been hooked, comprising:
   a) a handle;
   b) a foregrip extending coaxially from said handle;
   c) a reel seat extending from said handle to said foregrip;
   d) a reel replaceably attached to said reel seat;
   e) a blade extending coaxially from said foregrip to a free end; and
   f) means for alerting when the fish has been hooked;
   wherein said means includes a switch that electrically communicates with a power source interface, wherein said power source interface is disposed internally in said handle;
   wherein said switch is operatively connected to said blade, and closes when said blade is flexed;
   wherein said switch is a transducer having an output directly proportionate to amount of flexing of said blade;
   wherein said means further comprises an audio element that has an intensity and is disposed externally on said reel seat, electrically communicates with said switch, and enunciates when said switch is closed for audibly alerting that the fish has been hooked, by virtue of said switch being closed when said blade is flexed by the fish hooked, wherein said intensity of said audio element is directly proportionate to the amount of flexing of said blade, by virtue of said output of said transducer being directly proportionate to the amount of flexing of said blade; and
   wherein said audio element is a sound chip.

2. The pole as defined in claim 1, wherein said power source interface is for accommodating batteries.

3. The pole as defined in claim 1, wherein said means further includes an illuminating element that is disposed externally on said free end of said blade, electrically communicates with said switch, and illuminates when said switch is closed for visually alerting that the fish has been hooked, by virtue of said switch being closed when said blade is flexed by the fish hooked, wherein such flexing causes said blade to whip and cause said illuminating element to create a line of light that follows such whipping of said blade, and wherein said intensity of said illuminating element is directly proportionate to the amount of flexing of said blade, by virtue of said output of said transducer directly proportionate to the amount of flexing of said blade.

4. The pole as defined in claim 3, wherein said illuminating element is a bulb.

5. The pole as defined in claim 3, wherein said illuminating element is an LED.

* * * * *